United States Patent
Pu et al.

(10) Patent No.: US 11,818,803 B2
(45) Date of Patent: *Nov. 14, 2023

(54) LISTEN AGAIN AFTER TALK FOR BROADCAST/MULTI-CAST COMMUNICATIONS

(71) Applicant: Apple Inc., Cupertino, CA (US)

(72) Inventors: Tianyan Pu, Cupertino, CA (US); Haitong Sun, Irvine, CA (US); Wanping Zhang, San Jose, CA (US); Wei Zeng, San Diego, CA (US); Pengkai Zhao, San Jose, CA (US); Dawei Zhang, Saratoga, CA (US); Wei Zhang, Santa Clara, CA (US); Ping Wang, San Jose, CA (US); Sami M. Almalfouh, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,123

(22) Filed: Jun. 16, 2022

(65) Prior Publication Data

US 2022/0312551 A1 Sep. 29, 2022

Related U.S. Application Data

(63) Continuation of application No. 16/578,528, filed on Sep. 23, 2019, now Pat. No. 11,405,980.

(Continued)

(51) Int. Cl.
*H04W 88/06* (2009.01)
*H04W 72/0446* (2023.01)
(Continued)

(52) U.S. Cl.
CPC ....... *H04W 88/06* (2013.01); *H04W 72/0446* (2013.01); *H04W 72/56* (2023.01); *H04W 74/0825* (2013.01)

(58) Field of Classification Search
CPC . H04W 88/06; H04W 72/0446; H04W 72/56; H04W 74/0825
See application file for complete search history.

(56) References Cited

U.S. PATENT DOCUMENTS

| 8,594,120 B2 | 11/2013 | Mangold |
| 8,774,209 B2 | 7/2014 | Sadek |

(Continued)

FOREIGN PATENT DOCUMENTS

| CN | 106301733 A | 1/2017 |
| CN | 107079494 | 8/2017 |

(Continued)

OTHER PUBLICATIONS

Office Action for Chinese Application for Invention No. 201910920536.8; dated Jan. 20, 2023.

(Continued)

*Primary Examiner* — Mohammad S Anwar
(74) *Attorney, Agent, or Firm* — Kowert, Hood, Munyon, Rankin & Goetzel, P.C.

(57) ABSTRACT

Apparatuses, systems, and methods for a wireless device to perform methods to implement mechanisms for performing a listen again after talk procedure to detect collisions over an access medium. The wireless device may determine a frequency and configuration of modified transmission frames for transmission over an access medium (licensed or unlicensed) and may further determine a timing of the modified transmission frames within a transmission occasion. The wireless device may detect, during a listening period of the modified transmission frame, a collision and may adjust, (Continued)

based, at least in part, on the detected collision, a remaining transmission schedule for the transmission schedule and/or LBT parameters.

20 Claims, 14 Drawing Sheets

Related U.S. Application Data

(60) Provisional application No. 62/738,796, filed on Sep. 28, 2018.

(51) Int. Cl.
*H04W 74/08* (2009.01)
*H04W 72/56* (2023.01)

(56) References Cited

U.S. PATENT DOCUMENTS

| | | | |
|---|---|---|---|
| 9,392,614 | B2 | 1/2016 | Bhorkar |
| 9,955,357 | B2 | 4/2018 | Moon |
| 10,177,875 | B2 | 1/2019 | Dinan |
| 10,237,746 | B2 | 3/2019 | Fischer |
| 11,405,980 | B2 * | 8/2022 | Pu .................... H04W 88/06 |
| 2012/0134280 | A1 | 5/2012 | Rotvold et al. |
| 2016/0278078 | A1 | 9/2016 | Cheng et al. |
| 2016/0278088 | A1 | 9/2016 | Cheng et al. |
| 2016/0323811 | A1 | 11/2016 | Lepp et al. |
| 2018/0199300 | A1 | 7/2018 | Bergstrom |
| 2018/0263058 | A1 | 9/2018 | Yang |
| 2019/0037600 | A1 | 1/2019 | Urabayashi |
| 2019/0053222 | A1 | 2/2019 | Bhorkar |
| 2019/0150198 | A1 | 5/2019 | Sun |
| 2019/0166621 | A1 | 5/2019 | Yerramalli |

FOREIGN PATENT DOCUMENTS

| | | |
|---|---|---|
| CN | 107371273 | 11/2017 |
| CN | 107623919 | 1/2018 |
| EP | 3334235 A1 | 6/2018 |
| JP | 2016539519 A | 12/2016 |
| KR | 20160122512 A | 10/2016 |
| KR | 20170134529 A | 12/2017 |
| KR | 20180077281 A | 7/2018 |
| KR | 20180105128 A | 9/2018 |
| WO | 20160148621 A1 | 9/2016 |
| WO | 2017/050055 A1 | 3/2017 |
| WO | 2017170326 A1 | 10/2017 |

OTHER PUBLICATIONS

Communication pursuant for Article 94(3) EPC for EP Patent Application No. 19200209.5; 9 pages; dated Jan. 25, 2022.
Notice of Allowance for JP Patent Application No. 2019-177580, dated Aug. 10, 2021.
Apple "Resource allocation for V2X Broadcast and Groupcast Communication"; 3GPP TSG RAN WG1 Meeting #94bis R1-1811123; Chengdu, China; Oct. 8-12, 2018, 4 pages.
Notice of Preliminary Rejection for KR patent application No. 10-2019-0119601, dated Sep. 4, 2020.
Extended European Search Report for European Application No. 19200209.5, dated Feb. 17, 2020, 8 pgs.

* cited by examiner

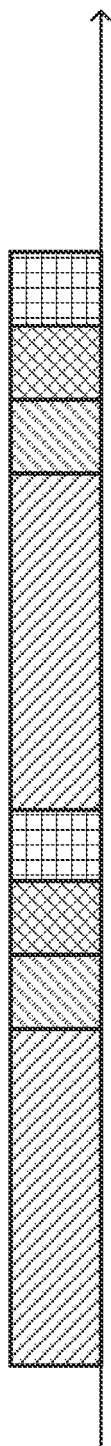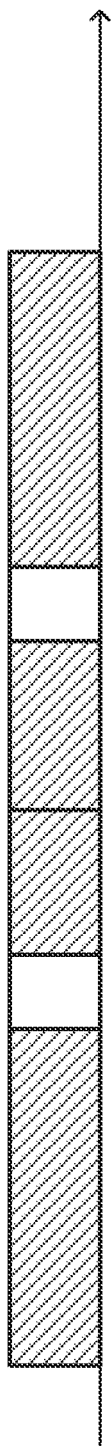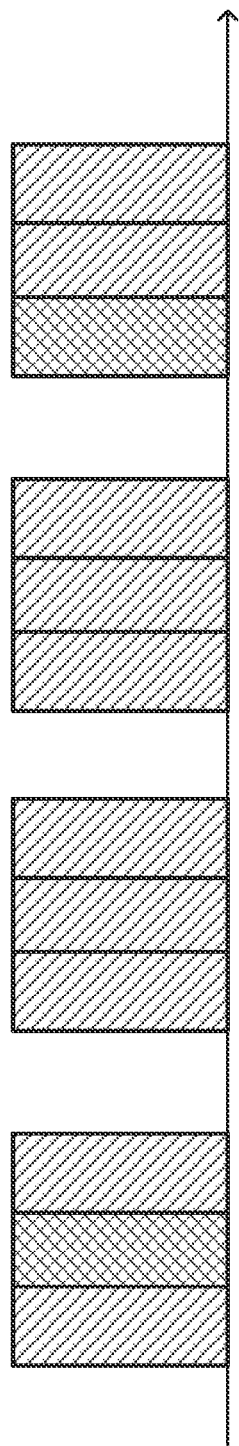

LISTEN AGAIN AFTER TALK FOR BROADCAST/MULTI-CAST COMMUNICATIONS

PRIORITY DATA

This application is a continuation of U.S. patent application Ser. No. 16/578,528, titled "Listen Again After Talk for Broadcast/Multi-cast Communications", filed Sep. 23, 2019, and which claims benefit of priority to U.S. Provisional Application Ser. No. 62/738,796, titled "Listen Again After Talk for Broadcast/Multi-cast Communications", filed Sep. 28, 2018, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to perform various cellular communication techniques.

The techniques described herein may be implemented in and/or used with a number of different types of devices, including but not limited to cellular phones, tablet computers, wearable computing devices, portable media players, and any of various other computing devices.

In some embodiments, a wireless device may determine a frequency and configuration of modified transmission frames for transmission over an access medium (licensed or unlicensed) and may further determine a timing of the modified transmission frames within a transmission occasion. In some embodiments, the transmission occasion may have been previously reserved via a listen before talk (LBT) procedure on an unlicensed access medium. In some embodiments, during a listening period of the modified transmission frame, the wireless device may detect a collision and may adjust, based, at least in part, on the detected collision, a remaining transmission schedule for the transmission schedule and/or LBT parameters associated with the unlicensed access medium. In some embodiments, the frequency of the modified transmission frames may be based on any, any combination of, and/or all of a velocity of the wireless device, a priority associated with data being transmitted during the transmission occasion, and/or results of prior listening periods. In some embodiments, the timing of the modified transmission frames may be randomized throughout the transmission occasion. In some embodiments, the timing of the modified transmission frames may follow a fixed (or known) pattern, e.g., the timing of the modified transmission frames may be every x milliseconds or microseconds. In some embodiments, the configuration of the modified transmission frames may be based on any, any combination of, and/or all of a transmission capacity of the wireless device, radio switching limitations of the wireless device, and/or collision detection accuracy. In some embodiments, the configuration of the modified transmission frames may be further based on an access medium idle time that indicates a minimum idle time required prior to reserving the access medium for transmissions.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 10 illustrates an example of a special subframe/slot structure, according to some embodiments.

FIG. 11 illustrates an example of a partially blanked subframe/slot structure, according to some embodiments.

FIG. 12 illustrates an example of a transmission schedule that includes opportunities for a listen again after talk (LAAT) procedure, according to some embodiments.

Figure 1A:
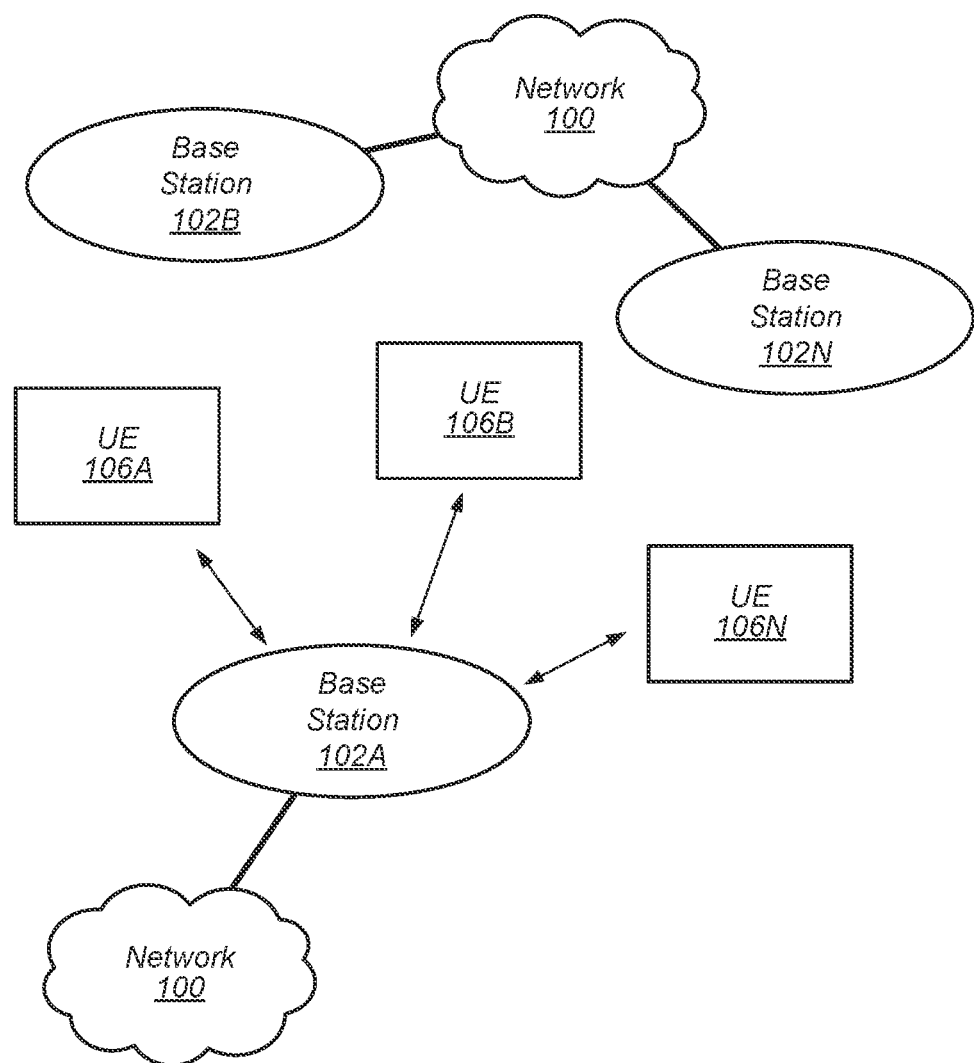
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
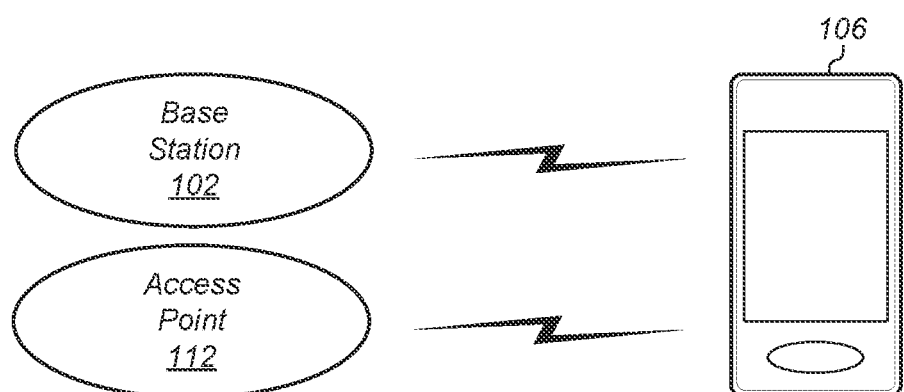
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
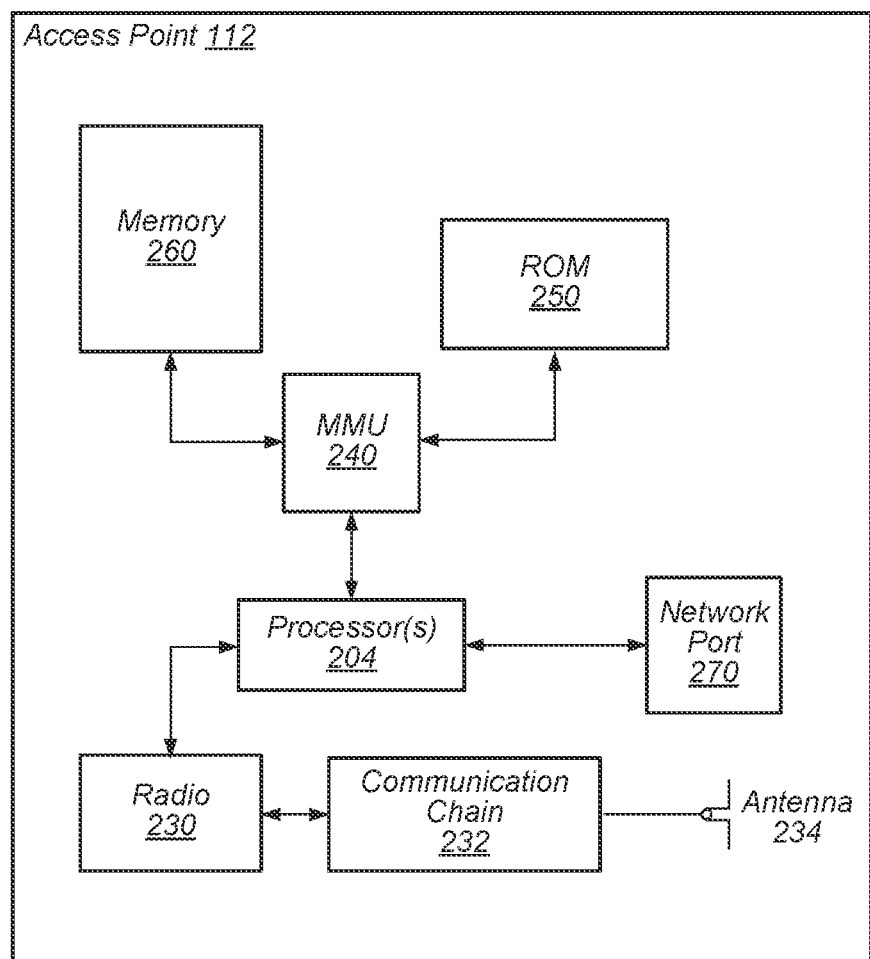
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for a LAAT procedure, e.g., as further described herein.

Figure 3:
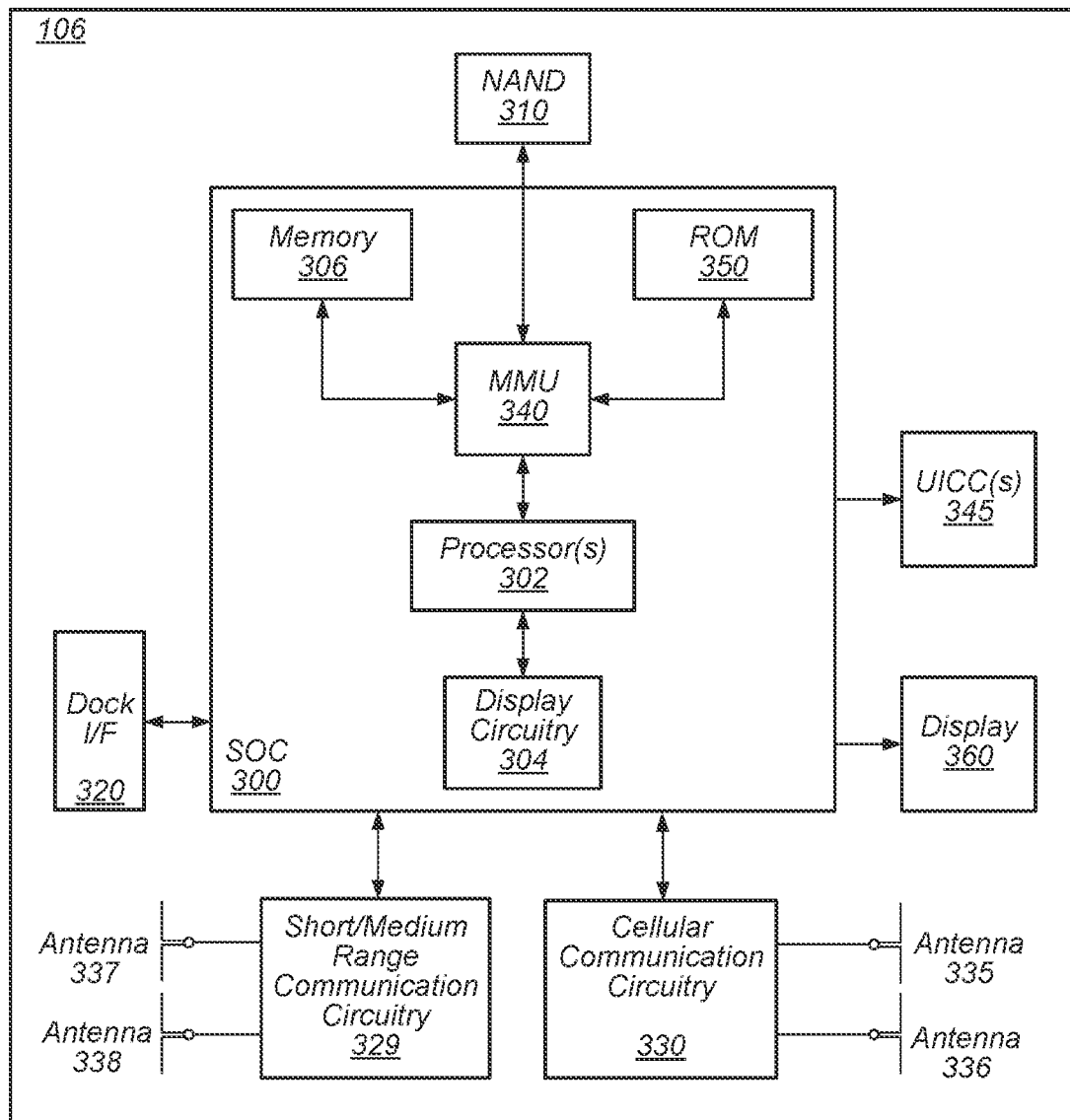
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for a LAAT procedure further described herein. In some embodiments, a communication device 106 may determine a frequency and configuration of modified transmission frames for transmission over an unlicensed access medium and may further determine a timing of the modified transmission frames within a transmission occasion. In some embodiments, the transmission occasion may have been previously reserved via a listen before talk (LBT) procedure on an unlicensed access medium. In some embodiments, during a listening period of the modified transmission frame, the communication device 106 may detect a collision and may adjust, based, at least in part, on the detected collision, a remaining transmission schedule for the transmission schedule and/or LBT parameters associated with the unlicensed access medium. In some embodiments, the frequency of the modified transmission frames may be based on any, any combination of, and/or all of a velocity of the communication device 106, a priority associated with data being transmitted during the transmission occasion, and/or results of prior listening periods. In some embodiments, the timing of the modified transmission frames may be randomized throughout the transmission occasion. In some embodiments, the configuration of the modified transmission frames may be based on any, any combination of, and/or all of a transmission capacity of the communication device 106, radio switching limitations of the communication device 106, and/or collision detection accuracy. In some embodiments, the configuration of the modified transmission frames may be further based on an access medium idle time that indicates a minimum idle time required prior to reserving the access medium for transmissions.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
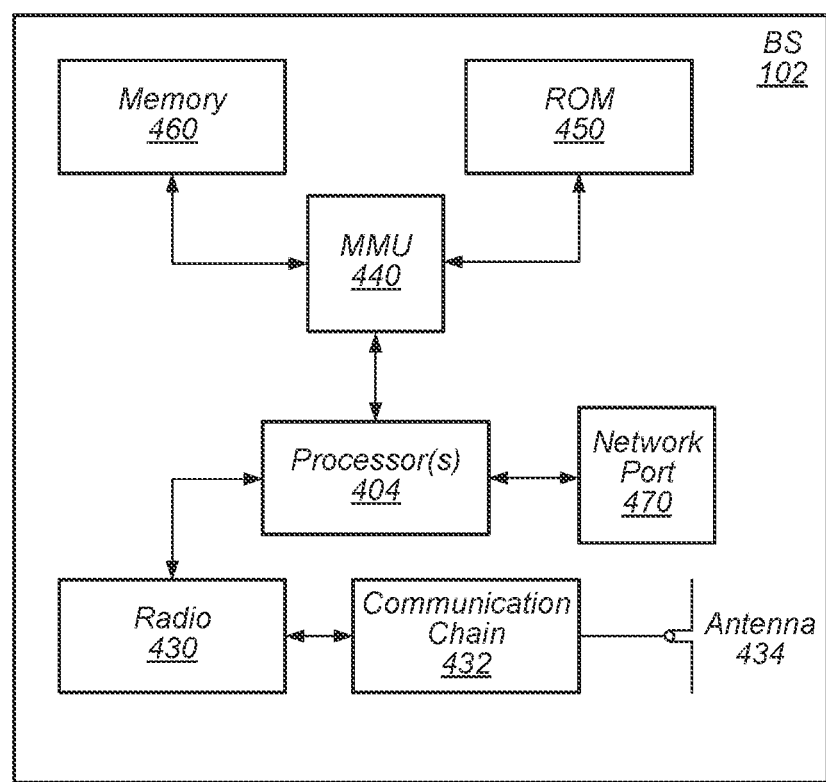
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
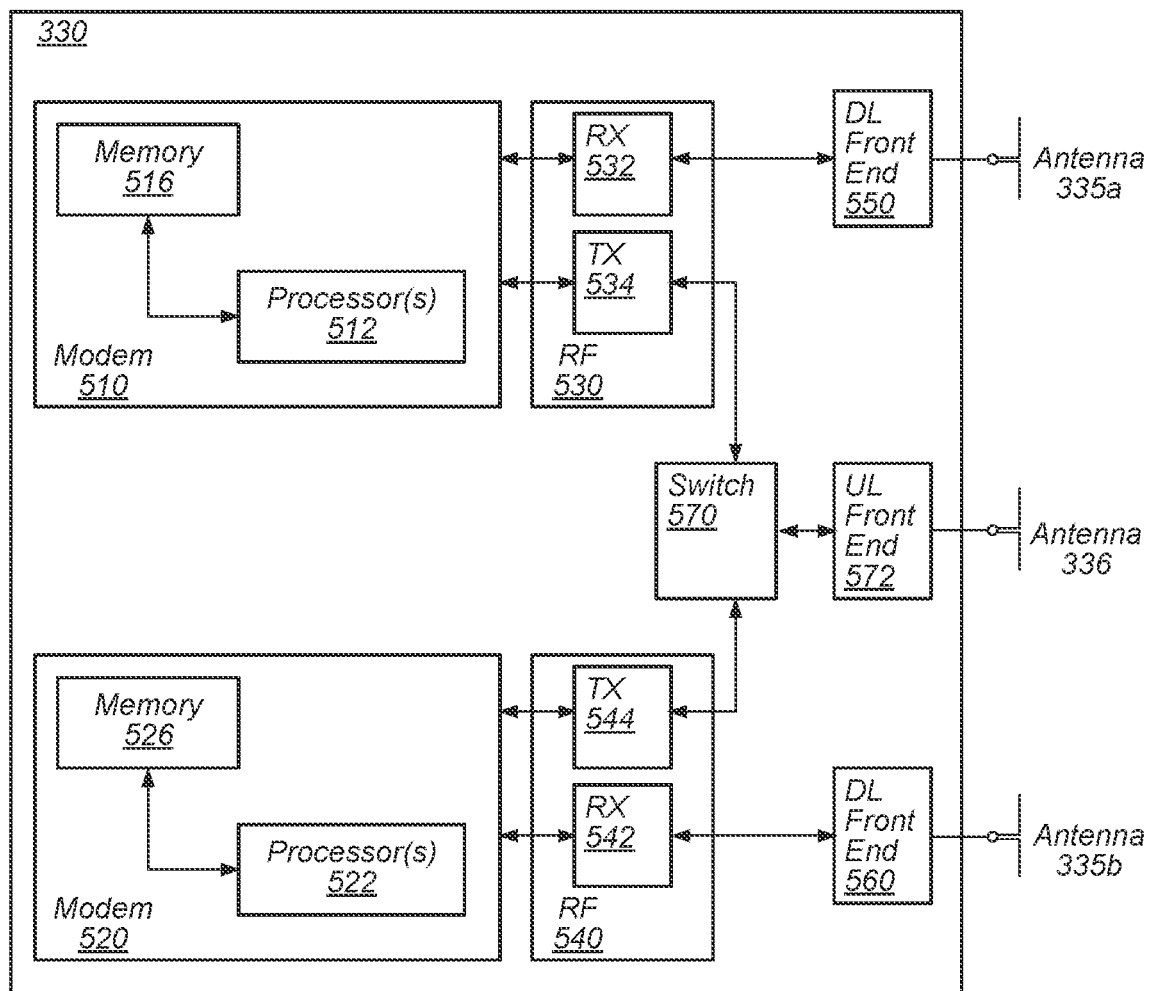
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for a LAAT procedure as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
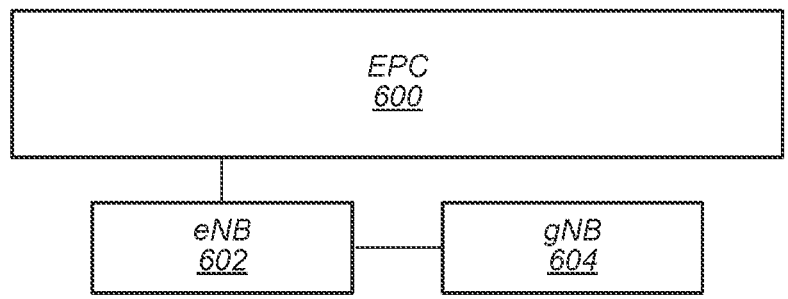
FIG. 6A illustrates an example of connections between an EPC network, an LTE base station (eNB), and a 5G NR base station (gNB).
Figure 6B:
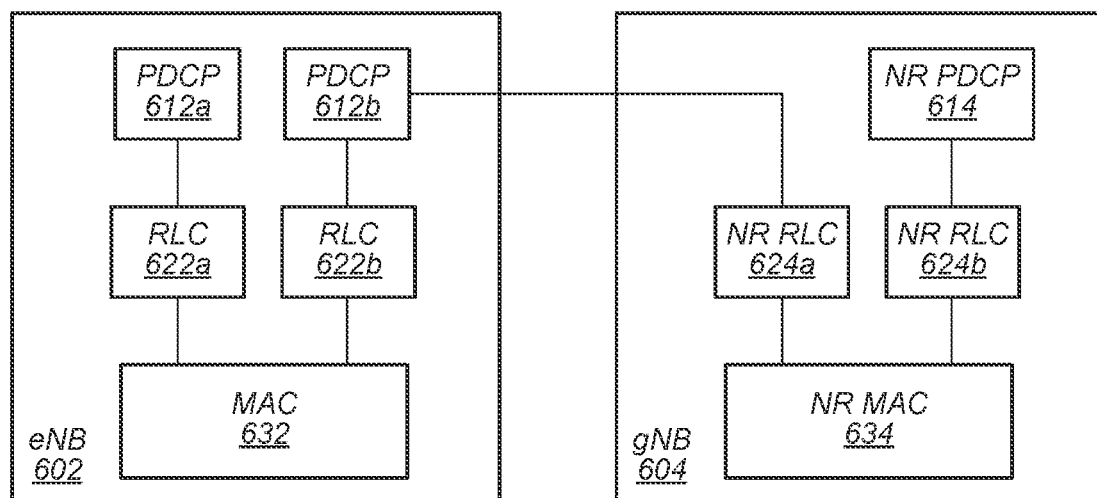
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
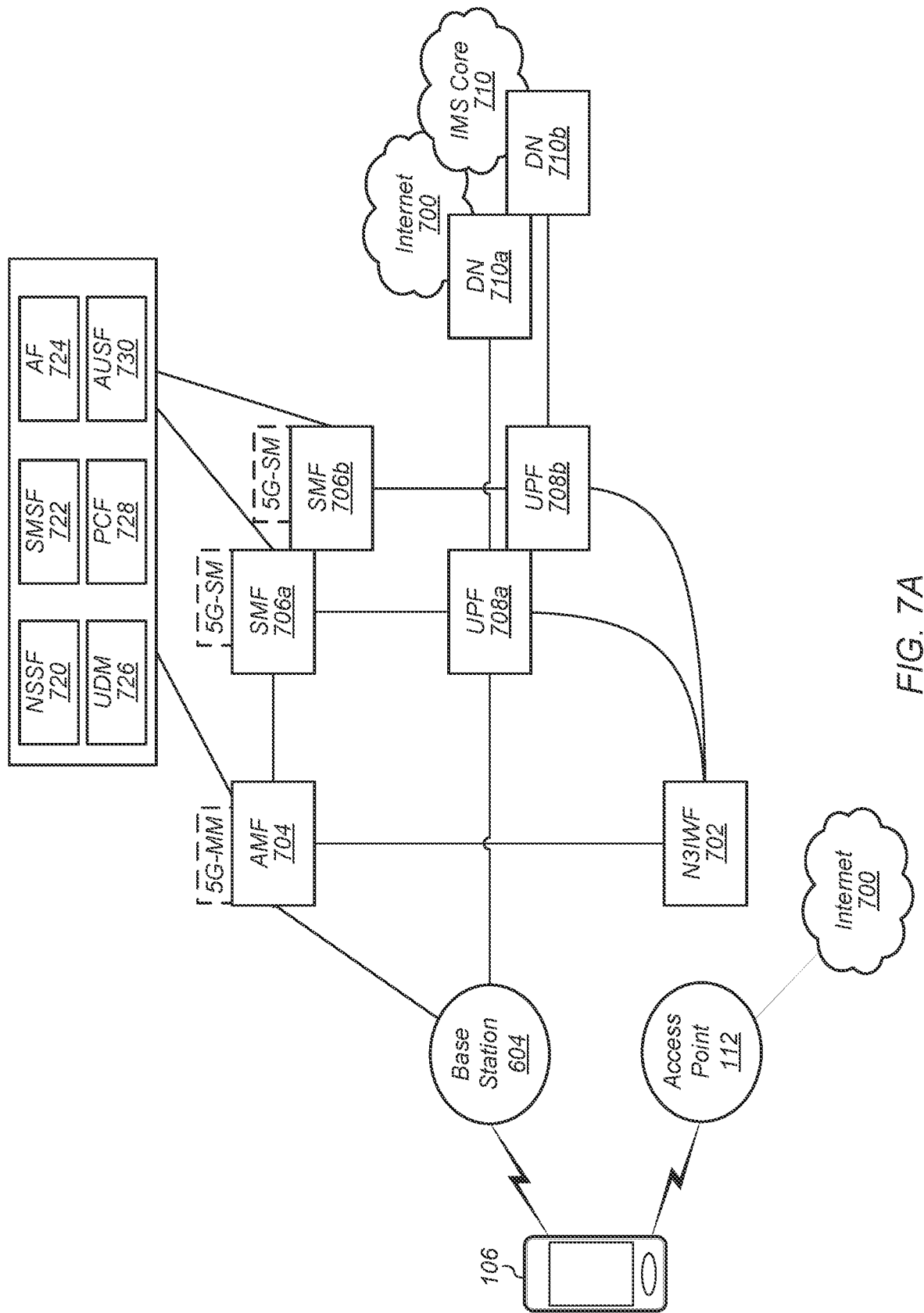
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
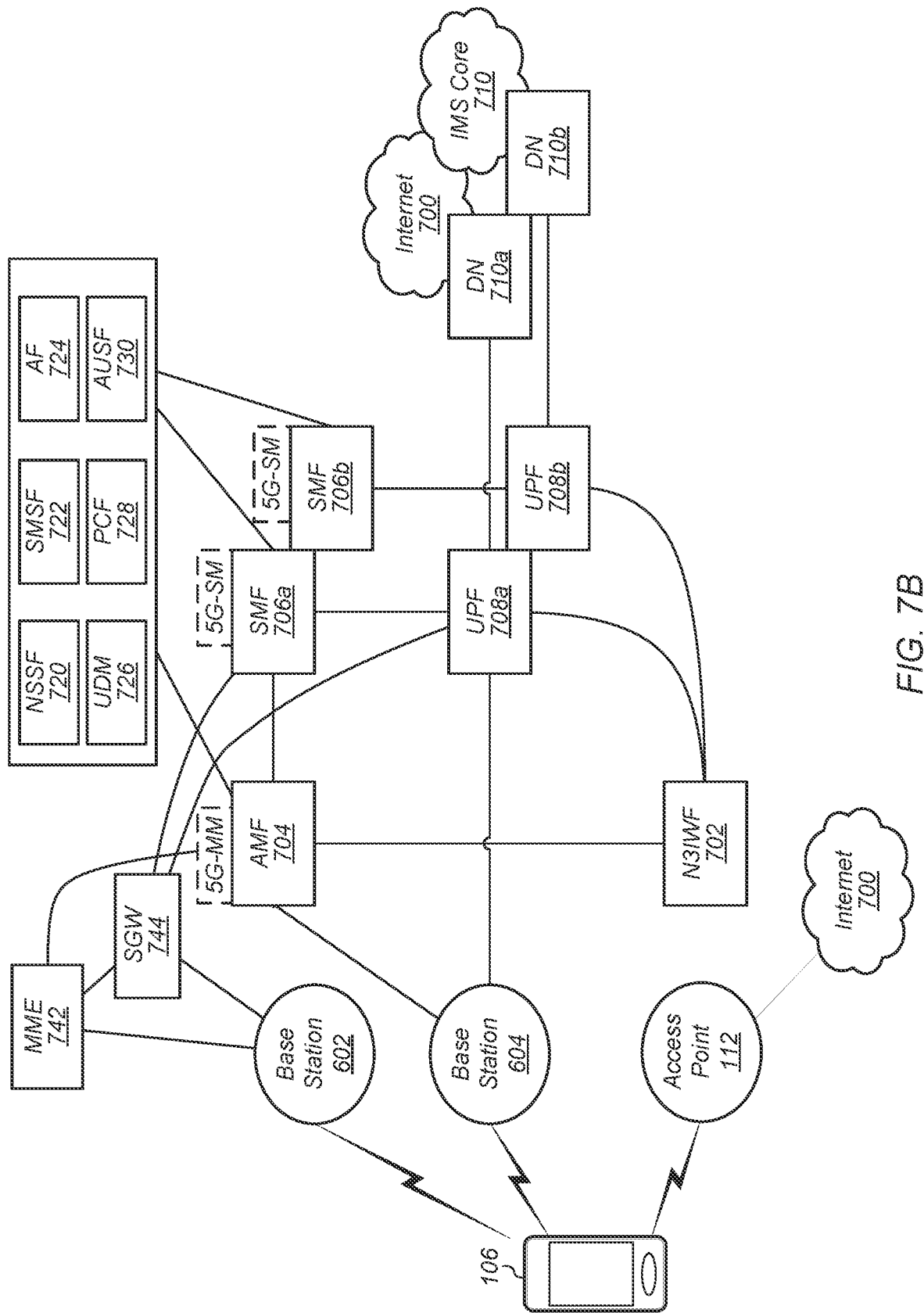
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to implement mechanisms for a LAAT procedure, e.g., as further described herein.

Figure 8:
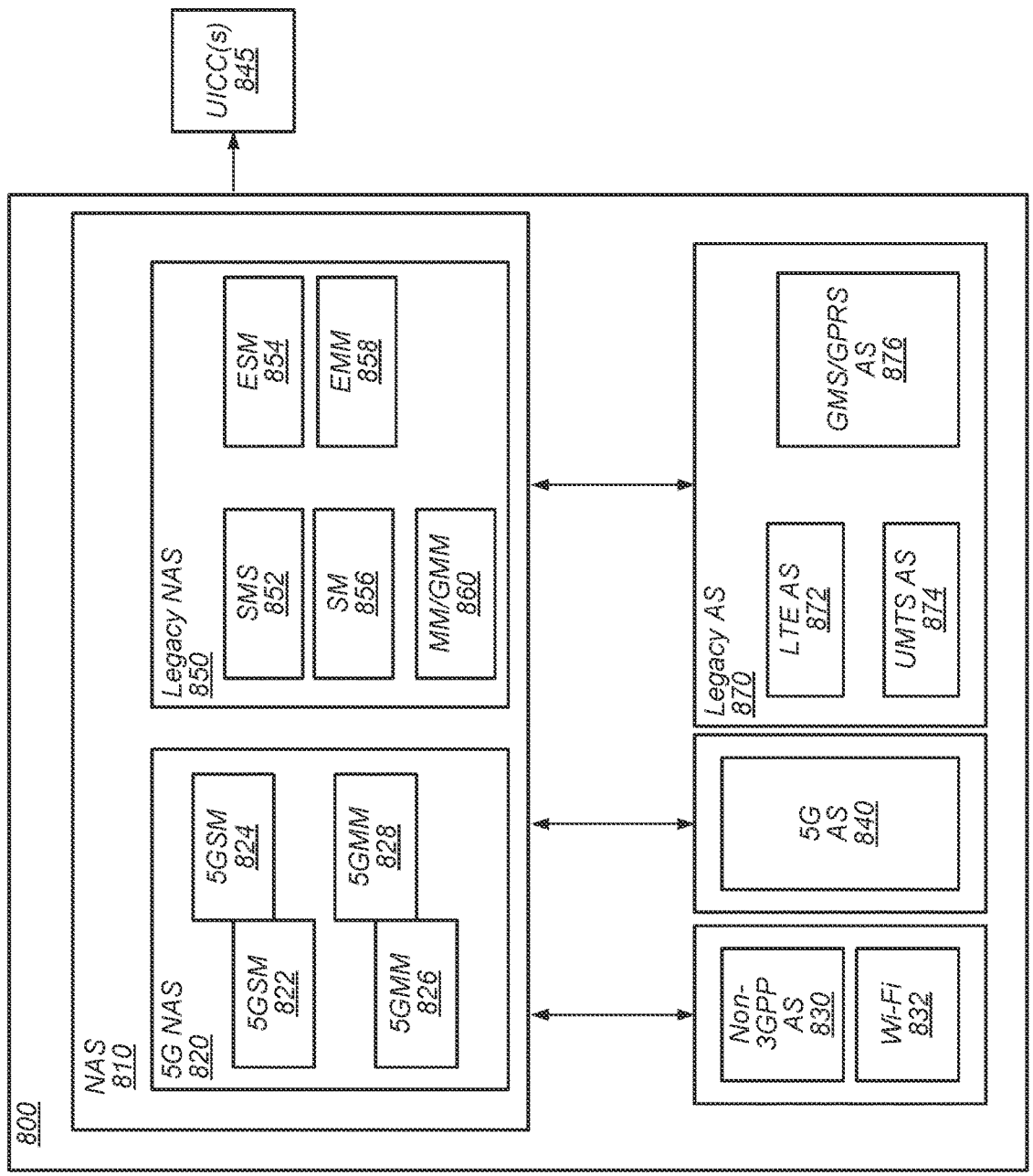
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for improved medium access and collision avoidance (e.g., a LAAT procedure), e.g., as further described herein.

Listen Before Talk

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a uni-cast transmission, a transmitter may readily detect a transmission collision based on a receiver's acknowledgement/negative acknowledgement (ACK/NACK) feedback. However, in the case of a multi-cast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multi-cast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, thus, a transmitter has no knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

Figure 9:
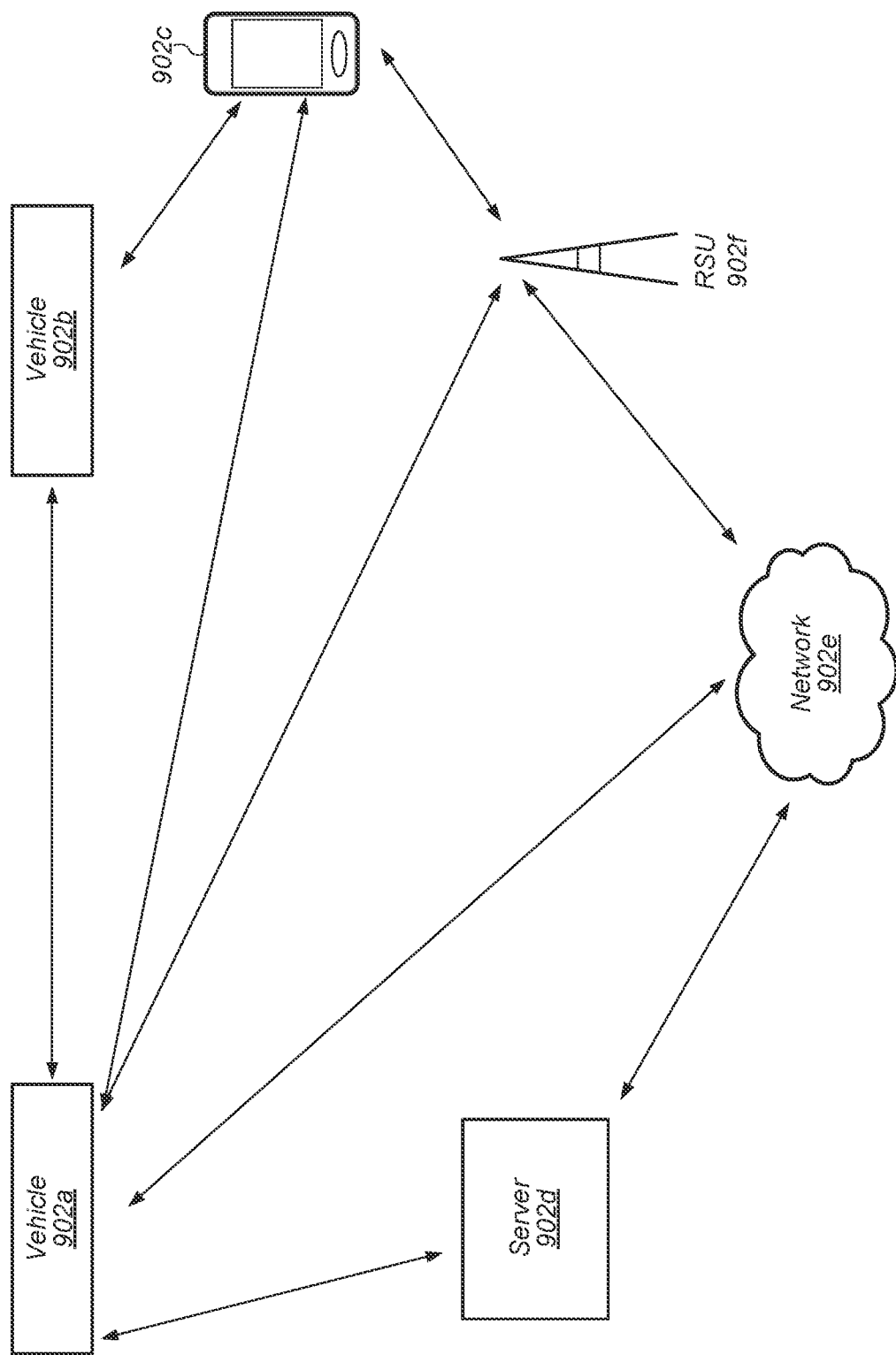
FIG. 9 illustrates an example of a vehicle-to-everything network.

As an example, vehicle-to-everything (V2X) communications, e.g., as specified by 3GPP TS 22.185 V.14.3.0, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 9, a vehicle, such as vehicle 902a may communication with various devices (e.g., devices 902b-f), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHz. Moreover, V2X communications may include uni-cast, multi-cast, and/or broadcast communications. Each communication type may employ an LBT mechanism. Further, under the V2X communication protocol, a transmitter may reserve periodic slots within a reservation period. Thus, as described above, in various cases a transmitter utilizing V2X communications, may, in some instances, be unable to detect collisions after using an LBT mechanism.

Embodiments described herein provide mechanisms for a transmitter in a shared access medium (e.g., non-3GPP access) to detect collisions after a listen to talk (LBT) procedure, e.g., a listen again after talk (LAAT) procedure. In some embodiments, a special subframe/slot structure (e.g., a modified transmission frame) may be implemented to allow a transmitter (e.g., of a wireless device 106 as described herein) to listen again (LA) after an LBT procedure. In some embodiments, a partially blanked subframe/slot structure may be implemented to allow a transmitter to LA after an LBT procedure. In some embodiments, a special or blanked subframe/slot structure may be randomly placed within a burst of subframes. In some embodiments, a special or blanked subframe/slot structure may have a fixed position within a burst of subframes.

In some embodiments, a listen again after talk procedure (e.g., an LAAT procedure) may be supported via a UE, such as UE 106, reserving a portion of channel occupancy time (COT) (e.g., a transmission occasion) for listening again. For example, a modified subframe/slot structure may be implemented to allow for a listen again during a COT. Note that the modified subframe/slot structure may be used for uni-cast, multi-cast, and/or broadcast transmissions. In some embodiments, a special subframe/slot structure may be implemented, e.g., as illustrated by FIG. 10. In some embodiments, a partially blanked subframe/slot structure may be implemented, e.g., as illustrated by FIG. 11. In some embodiments, a combination of a special subframe/slot structure and a partially blanked subframe/slot structure may be implemented.

As shown in FIG. 10, in some embodiments, a subframe may include an initial transmission period 1010, followed by a switching period 1012 to allow a radio of the UE to switch from transmission to reception. The switching period 1012 may be followed by a receive period 1014 in which the UE may listen again to determine whether a collision is likely and/or possible. The receive period 1014 (e.g., in which the UE listens again) may be followed by a switching period 1016 to allow the radio of the UE to switch from reception to transmission. As shown, in some embodiments, the subframe/slot structure may be repeated. In some embodiments, a duration of periods 1010-1016 may have multiple (a plurality and/or several) configurations such that a UE can balance (trade off) among transmission capacity, modem switching requirement, collision detection accuracy, and/or other requirements associated with transmission of data. In some embodiments, the receive period 1014 may be short enough in duration as to avoid another UE reserving the medium during this period. In some embodiments, e.g., in load-based equipment, such a consideration may have higher priority than in other embodiments or use cases.

As shown in FIG. 11, in some embodiments, a transmission subframe 1110 may include a partially blanked period 1112 which may be used for switching from transmission to receiving (and back again) as well as a listening period. Additionally, the partially blanked period 1112 may occur in different portions of the transmission subframe 1110, e.g., as illustrated by FIG. 11. Note that due to partial blanking, link adaptation information in a downlink control information (DCI) may accommodate a reduction in transmitted bits (e.g., due to the partial blanking), e.g., via a reduction in MCS. In some embodiments, a duration of the partially blanked period 1112 may have multiple (a plurality and/or several) configurations such that a UE can balance (trade off) among transmission capacity, modem switching requirement, collision detection accuracy, and/or other requirements associated with transmission of data. In some embodiments, the MCS may be reduced via an increase in redundancy such that receiver BLER is not impacted. In some embodiments, the partially blanked period 1112 may be short enough in duration as to avoid another UE reserving the medium during this period. In some embodiments, e.g., in load-based equipment, such a consideration may have higher priority than in other embodiments or use cases.

In some embodiments, when a broadcast/multi-cast transmission occasion can accommodate more than one subframe/slot, a modified subframe/slot structure (e.g., as described above) may be placed at random positions within transmission occasion. For example, as illustrated by FIG. 12, a UE, such as UE 106, may randomly select a position of a modified subframe/slot structure 1220 within a transmission occasion. Thus, as shown, in a first transmission burst of 3 subframes/slots, a middle subframe/slot may be switched from a standard transmission subframe 1210 to the modified subframe/slot structure 1220 (which may be either of subframes described above in reference to FIGS. 10 and 11). Additionally, as shown, a first subframe/slot of a fourth transmission burst of the transmission occasion may be switched from a standard transmission subframe 1210 to the modified subframe/slot structure 1220. Note that the switching of subframe types may reduce range and/or capacity of the transmission since the UE sacrifices transmission time to listen again. Thus, in some embodiments, frequency of using the modified subframe/slot structure 1220 may be based on several factors, such as UE speed, a priority of the transmission, and/or prior results of listening again (e.g., prior collisions). For example, a high mobility UE (e.g., a UE moving rapidly between communication groups) may have more chances to enter new communication group which it previously did not belong to leading to higher chances to cause collisions as compared to a lower mobility or stationary UE. Thus, in some embodiments, a frequency of modified subframe/slot structures used in within a transmission occasion may be based, at least in part, on UE mobility, e.g., a UE may increase/decrease modified subframe/slot frequency as the UE's speed increases/decreases. As another example, reliability may be more important for a higher priority message as compared to a lower priority message. Thus, when transmitting a higher priority message, there may be benefit to early detection of collisions so that a UE may have more opportunities to perform re-transmissions. Hence, in some embodiments, a UE may increase modified subframe/slot frequency for higher priority messages as compared to lower priority messages. As a further example, listen again results (e.g., history) indicate either prior collisions during listen again or prior no collisions during listen again. Thus, as possibility (or probability) of no collisions increases (e.g., as history indicates more occurrences of no collisions during listen again), the frequency of using modified subframe/slots may decrease. Similarly, as possibility (or probability) of collisions increases (e.g., as history indicates more occurrences of collisions during listen again), the frequency of using modified subframe/slots may increase.

Figure 13:
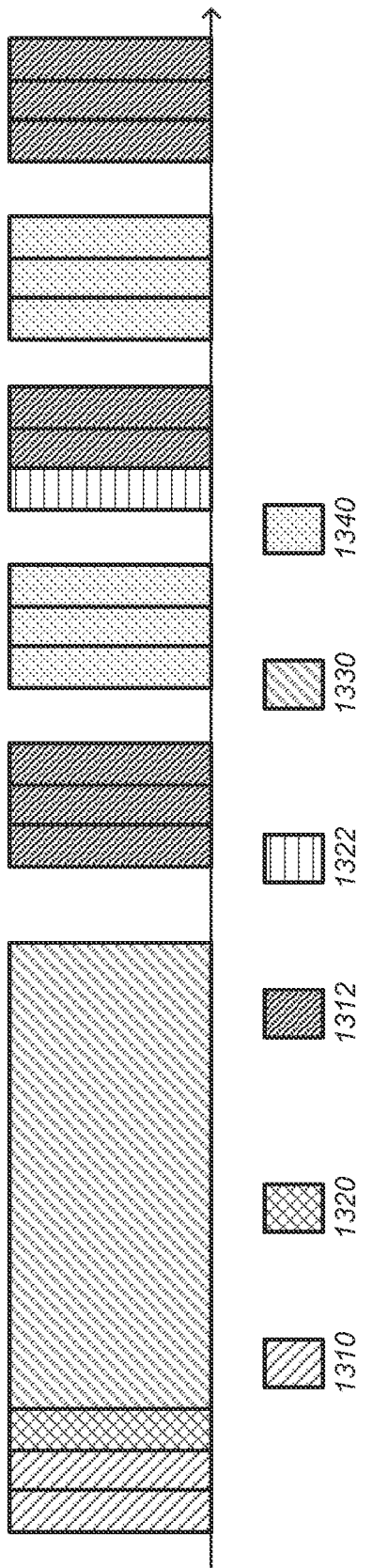
FIG. 13 illustrates an example of a transmission schedule that includes revised transmission timing based on an LAAT procedure detecting collisions, according to some embodiments.

In some embodiments, if a listen again (e.g., as described above) procedure detects a collision and a UE, such as UE 106, has remaining transmission opportunities (e.g., slots/subframes) within a transmission occurrence (e.g., reservation period), the UE may stop (or cancel) the remaining transmission opportunities and may re-initiate an LBT procedure to reserve a new transmission occurrence. For example, FIG. 13 illustrates a revision to a transmission occasion schedule, according to some embodiments. As shown, a transmission occurrence may begin (or continue) with standard transmission subframes 1310 followed by a modified subframe/slot 1320 in which a UE may detect a collision. As a result, the UE may initiate LBT procedure 1330. The LBT procedure 1330 may result in the scheduling of standard transmission subframes 1312 as well as modified subframe/slot 1322 instead of originally scheduled transmission subframes 1340. Additionally, the UE may increase a frequency of modified subframes/slots in order to increase listen again opportunities.

In some embodiments, if a listen again (e.g., as described above) procedure detects a collision and a UE, such as UE 106, has no remaining transmission opportunities (e.g., slots/subframes) within a transmission occurrence (e.g., reservation period), the UE may adjust one or more LBT procedure parameters in order to reduce a probability of collisions for subsequent medium access attempts. Additionally, the UE may adjust a listen again configuration to increase a frequency of modified subframes/slots in order to increase listen again opportunities.

In some embodiments, if a listen again (e.g., as described above) procedure does not detect a collision, a UE, such as UE 106, the UE may adjust a listen again configuration to decrease a frequency of modified subframes/slots in order to decrease listen again opportunities and increase transmission opportunities.

Figure 14:
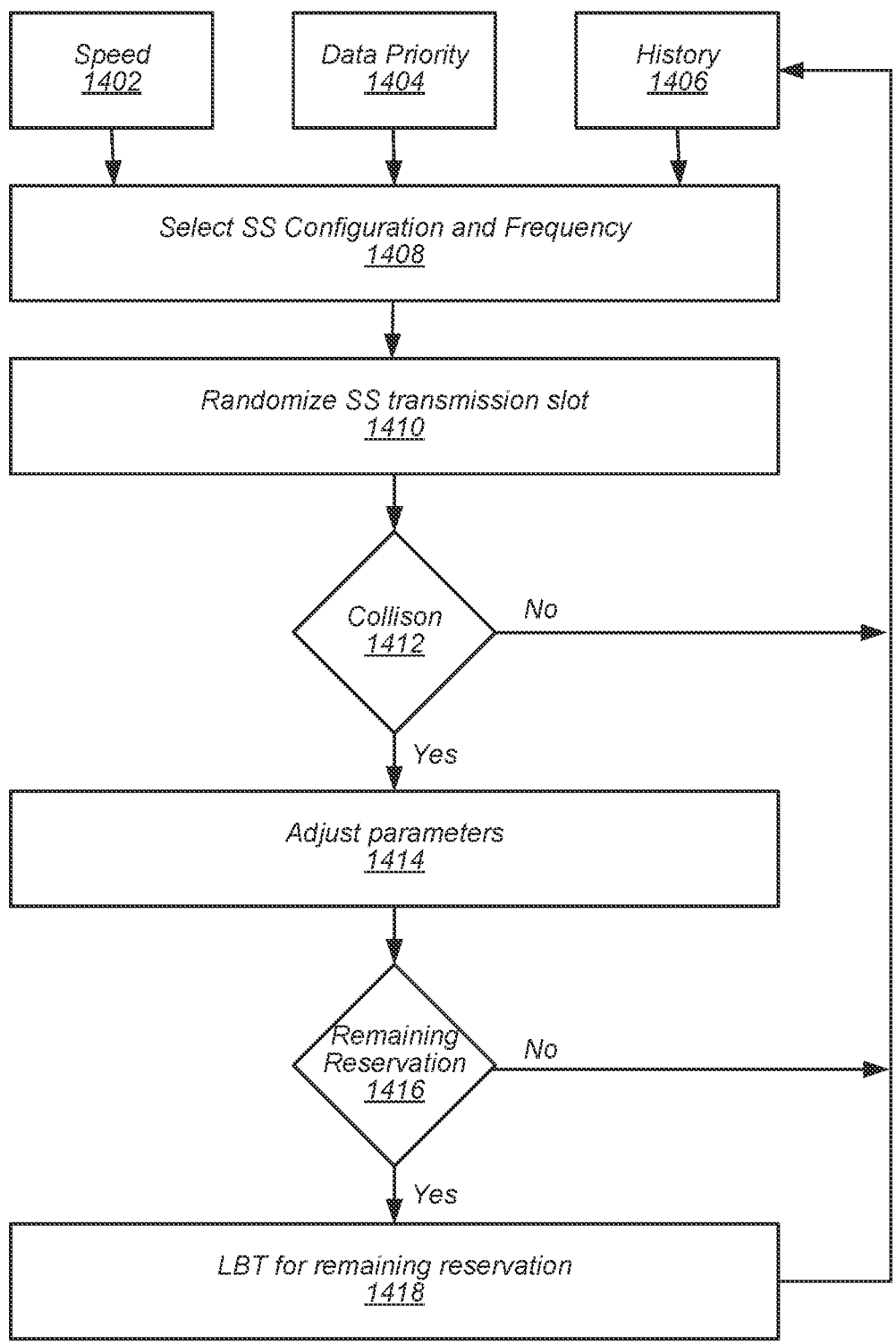
FIG. 14 illustrates a block diagram of an example of a method for a LAAT procedure, according to some embodiments.

FIG. 14 illustrates a block diagram of an example of a method for a listen again after talk (LAAT) procedure, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1408, a modified subframe/slot (SS) configuration and frequency may be determined (or selected). In some embodiments, the SS configuration may include parameters defining a transmission time during a subframe/slot, a listen time (or listen period) during a subframe/slot, as well as timing for switching between transmitting and receiving. In some embodiments, a blank (or null) period of a subframe/slot may be defined by a parameter and the blank period may be useable for listening and switching between transmit/receive and receive/transmit. In some embodiments, the SS configuration and/or frequency may be based, at least in part, on mobility (or speed) of a device, such as UE 106) as determined at 1402. In addition, the SS configuration and/or frequency may be based, at least in part, on a priority of a transmission (or a priority of data to be transmitted) as determined at 1404. In some embodiments, the SS configuration and/or frequency may be based, at least in part, on a prior history (or prior results) of prior LAAT procedures as determined at 1406.

At 1410, SS transmission slots may be randomized within a transmission period (or transmission opportunity). In some embodiments, randomization may aid in detection of collisions.

At 1412, collisions may be detected, e.g., during the listening period as configured at 1408. In some embodiments, a collision may be defined as receiving a signal from another device during the listening period. In some embodiments, a collision may indicate that a medium is not clear, thus, likelihood of successful transmission of data may be decreased. In some embodiments, if no collision is detected, the LAAT history may be updated at 1406.

At 1414, in response to detecting at least one collision, parameters associated with an LBT procedure may be adjusted. In addition, in some embodiments, parameters associated with the LAAT procedure may also be adjusted.

At 1416, a duration remaining in the transmission period may be determined. In some embodiments, if the transmission period has ended, the LAAT history may be updated at 1406.

At 1418, in response to determining that the transmission period has not ended (e.g. a reservation period has not ended), an LBT procedure (using adjusted parameters) for the duration remaining in the transmission period may be performed. The LBT procedure may be used to adjust timing for remaining transmissions within the transmission period. Further, in some embodiments, the LAAT history may be updated at 1406. In some embodiments, the LAAT history may be used to adjust the SS configuration and frequency.

Figure 15:
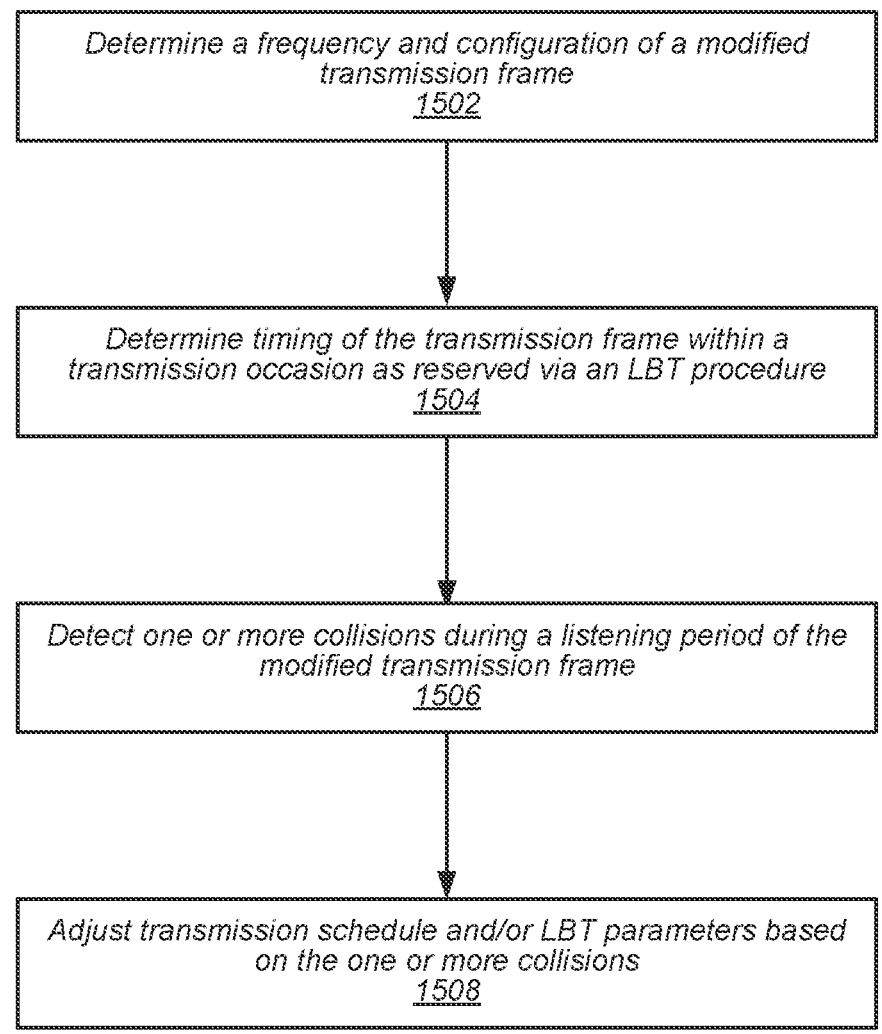
FIG. 15 illustrates a block diagram of another example of a method for a LAAT procedure, according to some embodiments.

FIG. 15 illustrates a block diagram of another example of a method for a listen again after talk (LAAT) procedure, according to some embodiments. The method shown in FIG. 15 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1502, a frequency and configuration of modified transmission frames may be determined, e.g., by a wireless device such as UE 106 described above. In some embodiments, a modem or radio of the wireless device may perform the method described herein. In some embodiments, the frequency of the modified transmissions frames may be based on any, any combination of, and/or all of a velocity of the wireless device, a priority associated with data being transmitted during the transmission occasion, and/or results of prior listening periods. In some embodiments, the frequency of the modified transmission frames may be increased as the velocity of the wireless device increases and the frequency of the modified transmission frames may be decreased as the velocity of the wireless device decreases. In some embodiments, the frequency of the modified transmission frames may be increased for higher priority data as compared to lower priority data. In some embodiments, when results of prior listening periods indicate a higher probability of collisions, the frequency of the modified transmission frames may be increased and when results of prior listening periods indicate a lower probability of collisions, the frequency of the modified transmission frames may be decreased. In some embodiments, the configuration of the modified transmission frames may be based on any, any combination of, and/or all of transmission capacity of the wireless device, radio switching limitations of the wireless device, and/or collision detection accuracy. In some embodiments, the configuration of the modified transmission frames may be further based on an access medium idle time that indicates a minimum idle time required prior to reserving the access medium for transmissions.

In some embodiments, a modified transmission frame may include time periods for transmitting data, for switching a radio of the wireless device from a transmission mode of operation to a receiving mode of operation, for listening to an access medium, and for switching the radio of the wireless device from the receiving mode of operation to the transmission mode of operation. In some embodiments, an occurrence of the non-transmitting time periods may be randomized for each modified transmission frame. In some embodiments, the non-transmitting time periods may be included in a blanked portion of a modified transmission frame. In some embodiments, a modulation and coding scheme (MCS) associated with a modified transmission frame may be reduced to account for the blanked portion.

At 1504, a timing of the modified transmission frames within a transmission occasion (e.g., a COT) may be determined. In some embodiments, the transmission occasion may have been previously reserved via a listen before talk (LBT) procedure performed by the wireless device. In some embodiments, the timing of the modified transmission frames may be randomized throughout the transmission occasion. In some embodiments, the timing of the modified transmission frames may follow a fixed (or known) pattern throughout the transmission occasion, e.g., the timing of the modified transmission frames may be every x milliseconds or microseconds. In some embodiments, the fixed patter may allow for better (or improved) coexistence with Wi-Fi, e.g., to decrease a probability of Wi-Fi signals colliding with cellular (e.g., side-link) signals.

At 1506, a collision may be detected during a listening period of a modified transmission frame. In some embodiments, detecting at least one collision may include receiving at least one transmission during the listening period of the modified transmission frame. In some embodiments, detecting at least one collision may include detection of an amount of energy that may be indicative of a transmission traffic (e.g., transmission being present over the access medium). In other words, a collision may be detected and/or predicted based on an amount of energy received with the amount of energy being indicative of a transmission being received and/or detected.

At 1508, a remaining transmission schedule and/or LBT parameters may be adjusted based, at least in part, on the detection of the collision. In some embodiments, adjusting the remaining transmission schedule may include the wireless device performing an LBT procedure for the remaining transmission schedule and adjusting the remaining transmission schedule based, at least in part, on results of the LBT procedure.

In some embodiments, in response to not detecting at least one collision, a data structure comprising results of prior listing periods may be updated. In some embodiments, in response to determining there are no remaining transmissions, the data structure comprising results of prior listing periods may be updated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a memory; and
at least one processor in communication with the memory, wherein the at least one processor is configured to cause the apparatus to:
identify a transmission occasion reserved via a listen before talk (LBT) procedure;
detect at least one collision during a listening period of the transmission occasion; and
determine a configuration of modified transmission frames within the transmission occasion based on the at least one collision and on a priority associated with data being transmitted during the transmission occasion.
2. The apparatus of claim 1,
wherein, to determine the configuration of modified transmission frames, the at least one processor is further configured to cause the apparatus to:
adjust a remaining transmission schedule of the transmission occasion.
3. The apparatus of claim 2,
wherein, to adjust the remaining transmission schedule of the transmission occasion, the at least one processor is further configured to cause the apparatus to:
perform an LBT procedure for the remaining transmission schedule; and
adjust the remaining transmission schedule based, at least in part, on results of the LBT procedure.
4. The apparatus of claim 1,
wherein the at least one collision includes a collision of the data being transmitted during the transmission occasion with at least one other transmission in a shared or unlicensed access medium.
5. The apparatus of claim 1,
wherein the at least one processor is further configured to cause the apparatus to:
determine a frequency of the modified transmission frames.
6. The apparatus of claim 5,
wherein the frequency of the modified transmission frames is based on at least one of:
a velocity associated with the apparatus;
the priority associated with the data being transmitted during the transmission occasion; or
results of prior listening periods.
7. The apparatus of claim 1,
wherein the at least one processor is further configured to cause the apparatus to:
determine a timing of the modified transmission frames.
8. The apparatus of claim 7,
wherein the timing of the modified transmission frames is randomized throughout the transmission occasion.
9. The apparatus of claim 1,
wherein the configuration of the modified transmission frames is further based on an access medium idle time, wherein the access medium idle time indicates a minimum idle time required prior to reserving the access medium for transmissions.
10. A baseband processor, comprising:
a memory; and
at least one processor in communication with the memory and configured to:
identify a transmission occasion reserved via a listen before talk (LBT) procedure;
detect at least one collision during a listening period of the transmission occasion; and
determine a configuration of modified transmission frames within the transmission occasion based on the at least one collision and on a priority associated with data being transmitted during the transmission occasion.

11. The baseband processor of claim 10,
wherein, to determine the configuration of modified transmission frames, the at least one processor is further configured to:
 adjust a remaining transmission schedule of the transmission occasion.

12. The baseband processor of claim 11,
wherein, to adjust the remaining transmission schedule of the transmission occasion, the at least one processor is further configured to:
 perform an LBT procedure for the remaining transmission schedule; and
 adjust the remaining transmission schedule based, at least in part, on results of the LBT procedure.

13. The baseband processor of claim 10,
wherein the at least one collision includes a collision of the data being transmitted during the transmission occasion with at least one other transmission in a shared or unlicensed access medium.

14. The baseband processor of claim 10,
wherein the at least one processor is further configured to:
 determine a frequency of the modified transmission frames, wherein the frequency of the modified transmission frames is based on at least one of:
  a velocity associated with the baseband processor;
  the priority associated with the data being transmitted during the transmission occasion; or
  results of prior listening periods.

15. A method for determining a configuration of modified transmission frames within a transmission occasion reserved via a listen before talk (LBT) procedure, comprising:
 identifying, by a user equipment device (UE), a transmission occasion reserved via a listen before talk (LBT) procedure;
 detecting, by the UE, at least one collision during a listening period of the transmission occasion; and
 determine, by the UE, a configuration of modified transmission frames within the transmission occasion based on the at least one collision and on a priority associated with data being transmitted during the transmission occasion.

16. The method of claim 15,
wherein, determining, by the UE, the configuration of modified transmission frames comprises:
 adjusting, by the UE, a remaining transmission schedule of the transmission occasion.

17. The method of claim 16,
wherein adjusting, by the UE, the remaining transmission schedule of the transmission occasion comprises:
 performing, by the UE, an LBT procedure for the remaining transmission schedule; and
 adjusting, by the UE the remaining transmission schedule based, at least in part, on results of the LBT procedure.

18. The method of claim 15,
wherein the at least one collision includes a collision of the data being transmitted during the transmission occasion with at least one other transmission in a shared or unlicensed access medium.

19. The method of claim 15, further comprising:
 determining, by the UE, a frequency of the modified transmission frames.

20. The method of claim 19,
wherein the frequency of the modified transmission frames is based on at least one of:
 a velocity of the UE;
 the priority associated with the data being transmitted during the transmission occasion; or
 results of prior listening periods.

* * * * *